No. 657,431. Patented Sept. 4, 1900.
C. J. MEAD.
VALVE FOR PNEUMATIC TIRES.
(Application filed Mar. 15, 1900.)
(No Model.)
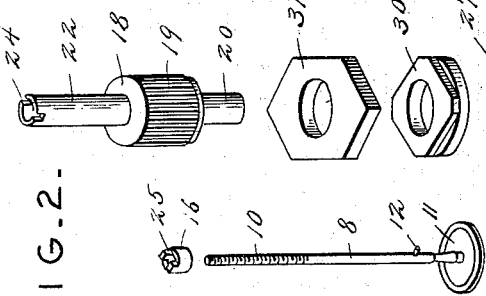
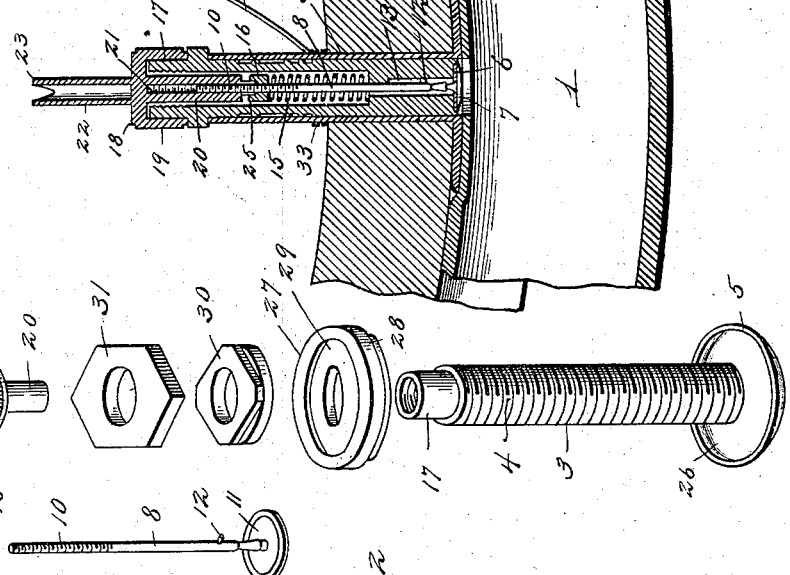
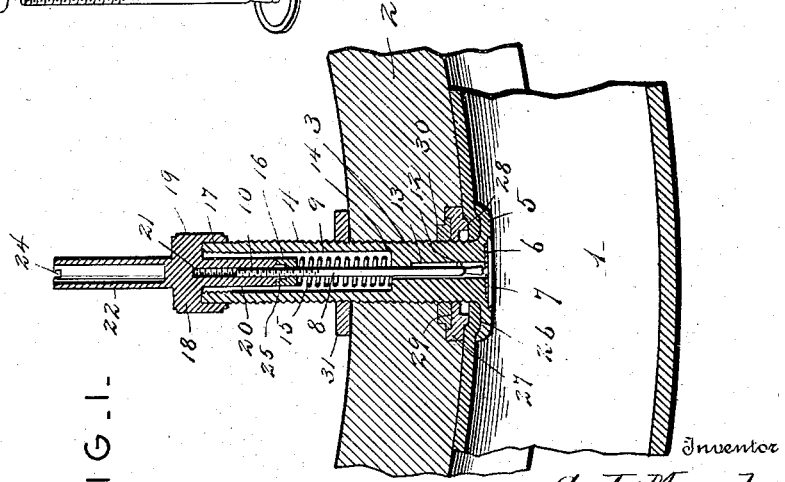
Witnesses
Harry L. Amer.
E. E. Lodge
Inventor
C. J. Mead.
by Rexford M. Smith
Attorney
THE NORRIS PETERS CO., PHOTO-LITHO., WASHINGTON, D. C.

UNITED STATES PATENT OFFICE.

CHANCY J. MEAD, OF NEW WINDSOR, ILLINOIS.

VALVE FOR PNEUMATIC TIRES.

SPECIFICATION forming part of Letters Patent No. 657,431, dated September 4, 1900.

Application filed March 15, 1900. Serial No. 8,785. (No model.)

*To all whom it may concern:*

Be it known that I, CHANCY J. MEAD, a citizen of the United States, residing at New Windsor, in the county of Mercer and State of Illinois, have invented a certain new and useful Valve for Pneumatic Tires, of which the following is a specification, reference being had therein to the accompanying drawings.

This invention relates to valves especially designed for pneumatic tires; and the object in view is to provide a valve of simple construction which may be applied to any pneumatic tire and which may be quickly and readily removed and the several parts thereof disassociated for repair and adjustment. Valves as ordinarily constructed are difficult to repair and require in most instances the service of an expert mechanic.

One object of this invention is to provide a valve which the ordinary rider may detach from the tire and which will permit the members thereof to be taken apart without the necessity of carrying tools for the purpose.

Another object is to make the valve *per se* of a construction which will enable a new valve-face or packing-washer to be applied when the old one becomes worn and inoperative.

Other objects and advantages of the invention will appear in the course of the subjoined description.

The invention consists in a valve embodying certain novel features and details of construction and arrangement of parts, as hereinafter fully described, illustrated in the drawings, and incorporated in the claim.

In the accompanying drawings, Figure 1 is a central longitudinal section through a valve constructed in accordance with this invention, showing also a section of a single-tube pneumatic tire with which the valve is associated. Fig. 2 is a perspective view showing the several members or parts of the valve disassociated. Fig. 3 is a sectional view similar to Fig. 1, showing a different type of valve designed for use in connection with the rubber valve-tube of a pneumatic tire. Fig. 4 is a perspective view showing parts of said valve disassociated.

Similar numerals of reference are employed to indicate corresponding parts in all the figures of the drawings.

Referring to the drawings, and particularly to Figs. 1 and 2, 1 designates a section of a pneumatic tire, and 2 a portion of the rim to which the tire is secured.

In carrying out the present invention I employ a metal valve-casing 3 of cylindrical form and exteriorly screw-threaded, as indicated at 4. At one end the casing 3 is provided with an enlarged head 5, provided in its outer face with a disk-shaped recess 6, in which is placed a flush seating-valve 7, which is in the form of a disk and which is attached to one end of a valve-stem 8, passing longitudinally through a central bore 9 in the casing 3 and terminally screw-threaded, as shown at 10. Placed against the inner face of the valve 7 is a packing-washer 11, which surrounds the stem 8. This packing-washer may be removed when worn and a new one substituted therefor. In order to prevent the valve and its stem from turning, the stem 8 is provided with a laterally-projecting key 12, which fits in a keyway 13 in the form of a groove extending longitudinally of the casing and forming an offset from the central bore thereof. The casing is also provided with an internal annular shoulder or seat 14, against which bears one end of a coiled spring 15, the opposite end of which bears against a nut 16, which is threaded upon the end of the valve-stem, as shown in Fig. 1. The extremity of the valve-casing 3 is left smooth externally, as shown at 17, and fitting around said end of the casing is a cap 18, which is thus free to be rotated thereon, said cap being peripherally knurled, as at 19, to facilitate the turning of the same. The cap is provided at one side with a hollow stem 20, which is internally threaded, as at 21, to engage the threaded valve-stem 8 in the manner shown in Fig. 1 for the purpose of drawing or forcing the valve 7 firmly against the valve-seat after the tire has been inflated and in order to prevent the escape of air. The cap 18 is provided on its opposite side with a nut-operating extension 22, having at its end teeth 23 or notches 24 to engage with the outer surfaces of the nut 16, which is correspondingly notched, as shown at 25.

In order to inflate the tire, the cap 18 is removed and a pump applied to the valve-casing in the ordinary manner. After the tire has been inflated the cap is placed on the casing and is turned until it draws the valve-stem 8 outwardly sufficiently to firmly seat the valve 7 and hold the same tightly within the recess in the outer face of the head 5 of the casing. To remove the valve, valve-stem, spring, and nut, the cap 18 is reversed, so that the nut-operating extension 22 will project into the valve-casing, whereupon by turning the cap the nut 16 may be removed from the valve-stem, thus enabling the operative parts of the valve to be removed, examined, and repaired, if necessary.

The inner surface of the head 5 is annularly recessed, as shown at 26, to receive the tire 1 immediately adjacent to the body of the valve-casing, as shown in Fig. 1, and in connection therewith I employ a washer 27, provided with an annular rib 28 for compressing the tire into the recess 26. The washer 27 is provided on its opposite side with a recess 29, in which fits a nut 30, by means of which the desired pressure will be brought against the washer 27 for firmly clamping the tire between the washer 27 and head 5. 31 designates a lock-nut adapted to bear against the inner face of the rim 2 for firmly connecting the valve-casing to the rim.

The valve illustrated in Figs. 3 and 4 is the same in all essentials as that above described, with the exception that the means for fastening the same to the tire and rim are omitted. The valve-casing in this instance is adapted to be slipped into the rubber valve-tube 32 of a tire and held by the usual strand or strands 33.

From the foregoing description it will be seen that I have provided a valve of simple and effective construction which may be applied to any form of tire and which may be readily removed by the ordinary rider. After the valve-casing is detached from the tire, by using the nut-operating extension of the cap the operative parts of the valve contained in the casing may be quickly removed, so that every piece of the valve may be carefully examined and the necessary repairs made, after which the parts may be reassembled and the valve as a whole again connected with the tire. Another very important feature resides in the fact that the valve may be forced with any desired pressure against the valve-seat, thus forming a perfectly-air-tight joint and preventing any possibility of the air escaping from the tire.

Having thus described the invention, what is claimed as new is—

A valve-casing having a central through-bore and an exteriorly-smooth outer end portion and also provided with an external recessed valve-seat at one end, in combination with a disk-shaped valve fitting within the recessed valve-seat, a terminally-threaded valve-stem, a removable disk-shaped packing-washer fitting around the stem and against the inner face of the valve, a nut adjustable on the valve-stem, a coiled spring around said stem between the nut and an internal shoulder within the casing, and a cap provided with an annular flange loosely embracing the end of the casing and having an internally-threaded stem to engage the valve-stem, and also having an oppositely-projecting nut-operating extension, substantially as specified.

In testimony whereof I affix my signature in presence of two witnesses.

CHANCY J. MEAD.

Witnesses:
J. WM. ALLEN,
C. F. TRIBLER.